(12) United States Patent
Tomita et al.

(10) Patent No.: US 8,352,084 B2
(45) Date of Patent: Jan. 8, 2013

(54) RENEWABLE ELECTRICITY GENERATION SYSTEM, ELECTRIC POWER MEASUREMENT DEVICE AND METHOD

(75) Inventors: Taminori Tomita, Yamato (JP);
Masahiro Watanabe, Hitachi (JP);
Yasushi Tomita, Mito (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 12/973,981

(22) Filed: Dec. 21, 2010

(65) Prior Publication Data
US 2011/0153098 A1 Jun. 23, 2011

(30) Foreign Application Priority Data
Dec. 21, 2009 (JP) ................................. 2009-289222

(51) Int. Cl.
*G06F 19/00* (2011.01)
(52) U.S. Cl. ........................ 700/276; 700/286
(58) Field of Classification Search .......... 700/276–278, 700/286, 291, 295; 60/641.8
See application file for complete search history.

(56) References Cited

U.S. PATENT DOCUMENTS
| | | | | |
|---|---|---|---|---|
| 5,539,633 A | * | 7/1996 | Hildebrand et al. | ............ 700/32 |
| 2002/0033020 A1 | * | 3/2002 | Tonomura et al. | ............ 60/641.8 |
| 2003/0139854 A1 | * | 7/2003 | Kolk et al. | .................... 700/291 |
| 2004/0238653 A1 | * | 12/2004 | Alles | ............................ 236/49.3 |
| 2007/0045431 A1 | * | 3/2007 | Chapman et al. | ........... 236/46 C |

FOREIGN PATENT DOCUMENTS
| | | |
|---|---|---|
| JP | 6332553 | 12/1994 |
| JP | 8070533 | 3/1996 |
| JP | 2002152976 | 5/2002 |

\* cited by examiner

*Primary Examiner* — Kidest Bahta
(74) *Attorney, Agent, or Firm* — Antonelli, Terry, Stout & Kraus, LLP.

(57) ABSTRACT

A solar power generation system comprising: plural customers each having a solar panel, a power convertor for converting DC output from the solar panel into AC output, an output controller for suppressing the power convertor output which becomes higher than a predetermined value, a measuring unit for measuring the amount of sold power, the amount of purchased power and the amount of generation-suppressed power; and an watt-hour meter measurement data adjusting unit linked with the plural customers via communication lines. The watt-hour meter measurement data adjusting unit calculates provisional generation-suppressed power amounts that make the burdens of the customers even, and calculates the power amounts to be sold by the customers on the basis of the provisional generation-suppressed power amounts. Thus, the generation-suppressed power of the solar power generation system can stabilize the power system and the chances for selling power can be fairly allocated to customers having solar panels.

11 Claims, 14 Drawing Sheets

FIG.3

| CUSTOMER ID | MONTH OF MEASUREMENT | AMOUNT OF PURCHASED POWER [kwh] | AMOUNT OF SOLD POWER [kwh] | AMOUNT OF GENERATION-SUPPRESSED POWER [kwh] | AMOUNT OF ADJUSTED SOLD POWER [kwh] |
|---|---|---|---|---|---|
| 001 | 2009/8 | 250 | 200 | 100 | 193 |
| 002 | 2009/8 | 600 | 0 | 0 | 0 |
| 003 | 2009/8 | 100 | 300 | 200 | 321 |
| 004 | 2009/8 | 350 | 100 | 50 | 96 |
| 005 | 2009/8 | 0 | 300 | 150 | 289 |
| 001 | 2009/9 | 300 | 100 | 50 | 92 |
| 002 | 2009/9 | 500 | 0 | 0 | 0 |
| 003 | 2009/9 | 100 | 200 | 100 | 183 |
| 004 | 2009/9 | 300 | 50 | 100 | 92 |
| 005 | 2009/9 | 0 | 200 | 100 | 183 |

| INSOLATION AMOUNT | GENERATED POWER [kw] |
|---|---|
| 0 | 0 |
| 20 | 30 |
| 40 | 60 |
| 60 | 90 |
| 80 | 100 |
| 100 | 120 |
| 120 | 120 |

FIG.14

| CUSTOMER ID | MONTH OF MEASUREMENT | AMOUNT OF PURCHASED POWER [kwh] | AMOUNT OF PRIMARILY ADJUSTED SOLD POWER [kwh] | AMOUNT OF ADJUSTED SOLD POWER [kwh] |
|---|---|---|---|---|
| 001 | 2009/8 | 250 | 300 | 193 |
| 002 | 2009/8 | 600 | 0 | 0 |
| 003 | 2009/8 | 100 | 500 | 321 |
| 004 | 2009/8 | 350 | 150 | 96 |
| 005 | 2009/8 | 0 | 450 | 289 |
| 001 | 2009/9 | 300 | 150 | 92 |
| 002 | 2009/9 | 500 | 0 | 0 |
| 003 | 2009/9 | 100 | 300 | 183 |
| 004 | 2009/9 | 300 | 150 | 92 |
| 005 | 2009/9 | 0 | 300 | 183 |

FIG.15

| POLE-MOUNTED TRANSFORMER ID | MONTH OF MEASUREMENT | POWER AMOUNT [kwh] |
|---|---|---|
| 001 | 2009/8 | 400 |
| 001 | 2009/9 | 650 |
| 002 | 2009/8 | 800 |
| 002 | 2009/9 | 1300 |
| 003 | 2009/8 | 500 |
| 003 | 2009/9 | 600 |

RENEWABLE ELECTRICITY GENERATION SYSTEM, ELECTRIC POWER MEASUREMENT DEVICE AND METHOD

BACKGROUND OF THE INVENTION

This invention relates to a power generation system utilizing natural energy, a power amount calculation apparatus and a power amount calculation method.

Recent growing awareness of global environmental problems has attracted peoples' attention to a Renewable electricity generation system free of pollution, especially a solar power generation system which uses solar cells. The solar power generation system, however, has its amount of generated power fluctuating depending on the daily insolation, i.e. hours of sunshine. In order to effectively utilize the extra power generated by the solar system and therefore to contribute to the stabilized supply of power, it is preferable to use solar power generation systems installed in individual homes or buildings in combination with a commercial power system.

In other words, the supply of power to loads usually takes place as a result of parallel operation of solar power generation systems and a commercial power source. All or part of power necessary for home consumption is supplied from a solar power generation system, and if the power generated by the solar power generation system becomes more than necessary for the home demand, the extra power is fed to the commercial power source, that is, the "reverse power flow" takes place.

The electric power company purchases reverse flow power by the preset unit price. This is a well-known power service customers' incentive for the installation of a solar power generation system.

The patent documents 1-3 listed below relate to this invention.

Patent Document 1: JP-A-08-70533
Patent Document 2: JP-A-06-332553
Patent Document 3: JP-2002-152976

FIG. 2 diagrammatically shows an example of a distributed power source system using a solar battery as a power source, disclosed in the above patent document 1. In FIG. 2, the distributed power source system comprises a solar cell array 201 and a power conversion apparatus 202 incorporating therein an inverter (inverter circuit) 203 for converting the DC power outputted from the solar cell array 201 into AC power.

The power conversion apparatus 202 incorporates therein a circuit breaker 205 for separating the distributed power source from the commercial power system 204, and a system linkage protection apparatus 212 which includes an islanding detector 207 that detects the dissection of a circuit breaker 206 belonging to the commercial power system 204 on the basis of the fluctuation of frequency or voltage and that dissects the circuit breaker 205 in response to the detection of the dissection of the circuit breaker 206.

The system linkage protection apparatus 212 includes an arithmetic operation unit 208, a variable output unit 209, a control unit 210 and a display 211. The arithmetic operation unit 208 calculates the power generated by the solar cell array 201 on the basis of the output voltage and output current of the solar cell array 201 which are obtained through measurement.

The variable output unit 209 changes the output voltage of the solar cell array 201. The control unit 210, by changing the output voltage of the solar cell array 201 through the control of the variable output unit 209, performs at regular intervals a searching operation for searching the output voltage that makes maximum the generated power calculated by the arithmetic operation unit 208. The display 211 is used to make an indication that generated power amount is abnormal.

The islanding detector 207, the arithmetic operation unit 208, the variable output unit 209 and control unit 210 are integrated into a single entity as a microcomputer 212. By controlling the inverter circuit 203 via the variable output unit 209, the control unit 210 changes the output voltage of the solar cell array 201 and searches the value of voltage that makes maximum the detected value of the output power delivered from the arithmetic operation unit 208.

A solar power generation system is usually provided with a system linkage protection apparatus that monitors the voltage at the point at which the solar power generation system is linked with a commercial power system and that separates the solar power generation system from the commercial power system by actuating a relay when the voltage at the link point assumes a value that does not fall within the rated range, that is, power supply abnormality occurs, and therefore provided with the function of immediately stopping the power generation by the solar power generation system so as to suppress the voltage rise at the link point.

The patent document 2 discloses a technique according to which output suppression control is employed that does not stop the power generation by the solar power generation system but that monitors the voltage at the link point and makes the generated output smaller than the maximum value when the voltage approaches the rated upper limit value.

The patent document 3 discloses a method according to which, in a power system connected with plural distributed power source systems such as solar power generation systems, the plural distributed power source systems are linked with a system administration apparatus via a communication network; each distributed power source system includes a system control unit which transmits the operating information of the distributed power source to the system administration apparatus; and the operating condition is controlled in response to the instruction received from the system administration apparatus.

SUMMARY OF THE INVENTION

As described above, in the solar power generation system, selling of electric power has been practiced while the power system is protected so that the voltage at the point of link with the power system can fall within the rated range.

In a commercial power system having plural solar power generation systems linked therewith, output suppression may concentrate on a specific one of the plural solar power generation systems due to uneven functions of detecting voltages in the respective solar power generation systems or conditions at the point of linkage with the power system. In such a case, the power amounts bought from the owners of the solar power generation systems becomes uneven, leading to unfair power purchase among the owners.

As a countermeasure for coping with this problem, the above mentioned patent document 3 discloses a method according to which, in a power system including plural distributed power sources such as solar power generation systems, the respective distributed power source systems are linked with a system administration apparatus via a communication network, each distributed power source system including a system control unit; the system control unit transmits to the system administration apparatus the information on the operation of the associated distributed power source system; and the operating condition is controlled in response to the instruction delivered from the system administration apparatus.

According to the disclosed method, the system administration apparatus receives the operating condition of the voltage rise suppression function of each distributed power source; searches those distributed power sources connected to a pole-mounted transformer (or simply pole-transformer) in reference to database; and commands the respective system control units to cause the associated distributed power sources to deliver their outputs in such a manner that the reverse flow powers from the respective distributed power sources may be balanced among them.

In this example, however, the provision of system control units is mandatory and therefore an additional cost is necessary. Further, while the voltage rise suppression function, which is installed for maintaining security, is operating, power generation cannot be executed in accordance with the instruction from the system administration apparatus. Moreover, there occurs a case wherein the power system voltage cannot be sufficiently lowered even if the power outputs of other distributed power sources are suppressed.

Furthermore, a case may occur wherein proper control becomes difficult due to the time lag between the instant that the system administration apparatus receives the operating condition of a distributed power source and the instant that the system administration apparatus responds to the control command. Especially in a solar power generation system which is a distributed power source whose generated power changes with the change in the daily insolation, the time lag in the response to a control command considerably affects the system performance. Thus, in a power generation system utilizing natural energy which is installed in a home or a building, linked with a commercial power system, and sell superfluous power to the electric power company through reverse power flow to the power system, the power generation system may sometimes be forced to stop or suppress its power generation, leading to the loss of chance for selling power due to the abnormality of the voltage at the point of linkage with the commercial power system or some condition on the side of commercial power system.

This loss of chance for selling power may not be uniformly allocated to customers who owns distributed power sources, depending on the points of linkage with the commercial power system, the operating conditions of voltage rise suppression functions such as system linkage protective devices provided for respective solar power generation systems, or the time lags in control associated with the distributed power sources.

Further, according to the conventional art described above, since no means is provided for evaluating the contribution to the stabilization of power system in a case where power generation is stopped or suppressed to maintain the voltage quality of the power system, the owners of solar power generation systems suffer from the loss of chance for selling power when the power generation is stopped or suppressed so as to stabilize the operation of the power system.

The object of this invention, which has been made to solve the above mentioned problem, is to provide a solar power generation system according to which the contribution of the generation-suppressed power of the solar power generation system to the stabilization of power system operation can be evaluated; and the chances for selling power can be fairly allocated to the owners of solar power generation systems.

In order to solve the above mentioned problem, this invention has employed the following constitutions.

The constitution comprises:

plural customers each incorporating a power conversion apparatus for converting DC output from a solar panel into AC output which is supplied to a commercial power system;

a control unit for monitoring the output voltage of the power conversion apparatus, normally performing maximum power follow-up control so that the power conversion apparatus can generate its maximum power, and performing output-suppression control that suppresses the output of the power conversion apparatus when the output voltage becomes higher than a predetermined value; and a measuring unit for measuring the amount of power to be sold from the power conversion apparatus, the amount of power to be bought from the commercial power system, and the amount of generation-suppressed power generated when the output is suppressed; and an watt-hour meter measurement data adjusting unit linked with the plural customers via a communication lines;

wherein the watt-hour meter measurement data adjusting unit calculates provisional generation-suppressed power amounts that make the burdens of the customers even, independent of the actual generation-suppressed power amounts, and calculates the amounts of power to be sold by the customers on the basis of the provisional generation-suppressed power amounts; or the watt-hour meter measurement data adjusting unit receives the generation-suppressed power amounts and the actually generated power amounts of the owners of solar power generation systems and calculates the amounts of power to be sold by the customers on the basis of the generation-suppressed power amounts and the actually generated power amounts.

According to this invention which has such a constitution as described above, the contribution of the generation-suppressed power of the solar power generation system to the stabilization of the commercial power system operation can be evaluated; and the chances for selling power can be fairly allocated to the owners of solar power generation systems.

Other objects, features and advantages of the invention will become apparent from the following description of the embodiments of the invention taken in conjunction with the accompanying drawings.

BRIEF DESCRIPTION OF THE DRAWINGS

FIG. 3 is a table that lists the data stored in the database of watt-hour meter measurement data;

FIG. 14 is a table listing the content of the database of watt-hour meter measurement data, that is, data for respective customers;

FIG. 15 is a table listing the amounts of power passed through the pole-transformer.

DETAILED DESCRIPTION OF THE INVENTION

Figure 1:
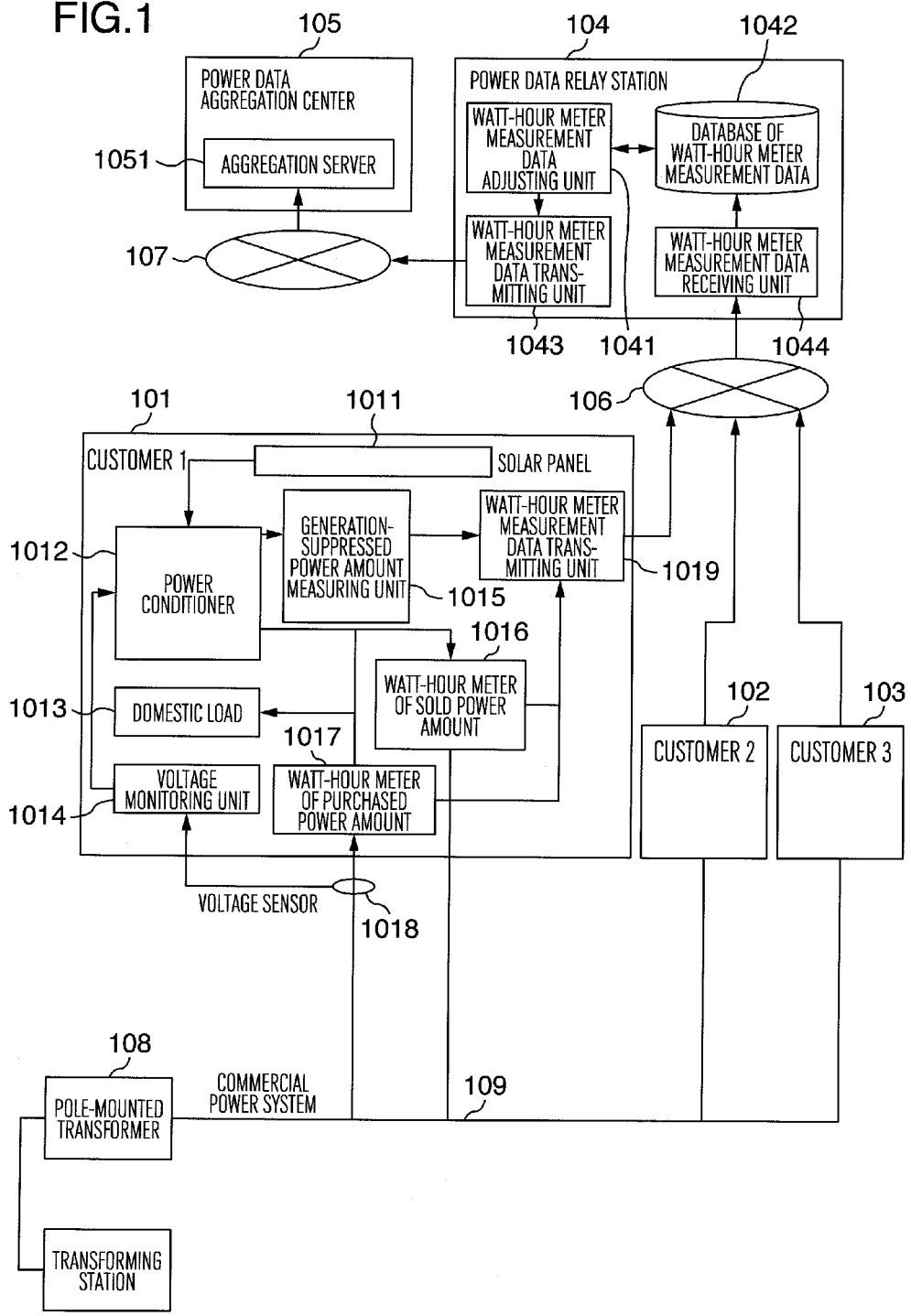
FIG. 1 diagrammatically shows a solar power generation system as a first embodiment of this invention.
Figure 2:
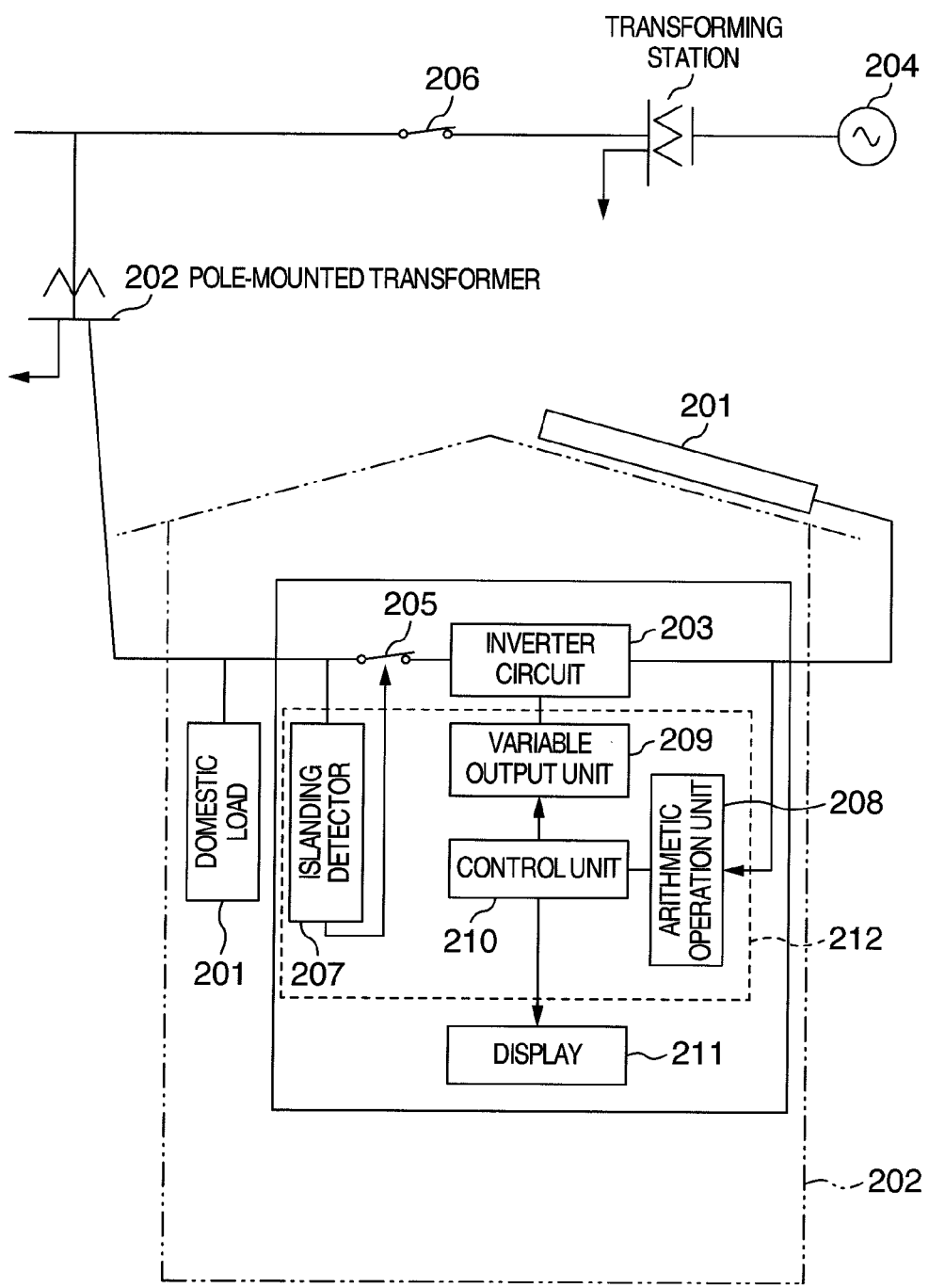
FIG. 2 diagrammatically shows an example of a distributed power source system using a solar battery as a power source.

Now, the best mode of this invention will be described below in reference to the attached drawings. FIG. 1 diagrammatically shows a solar power generation system as a first embodiment of this invention. In FIG. 1, customers 1~3 are usually linked with a power data relay station 104 via a communication network 106. The power data relay station 104 is linked with a power data aggregation center 105 via a communication network 107. The respective customers are provided with electric power from a commercial power system 109 via a pole-mounted transformer (hereafter referred to simply as pole-transformer) 108. Superfluous power generated by a solar power generation system is fed into the commercial power system as reverse flow power.

Customer 1 (101) is provided with a solar panel 1011 as a power generating unit. The DC power generated by the solar panel 1011 is transformed into AC power having commercial frequency by means of a power conditioner 1012. The AC power having the commercial frequency is supplied to a domestic load 1013. Also, the power conditioner 1012 performs a follow-up control for the maximum power of solar battery (MPPT control).

That portion of power generated by the solar panel which cannot be consumed by the domestic load 1013, is fed back as reverse flow power to the power system 109. The amount of the reverse flow power is measured by a watt-hour meter 1016 of sold power amount.

If the power generated by the solar panel is not enough to feed the domestic load 1013, power is additionally supplied to the domestic load 1013 from the commercial power system 109. The amount of the power supplied to the domestic load 1013 from the power system 109 is measured by a watt-hour meter 1017 of purchased power amount.

The voltage of the commercial power system 109 is measured by a voltage sensor 1018 and monitored by a voltage monitoring unit 1014. The result of monitoring is transmitted to the power conditioner 1012, and used for the control of output in the power conditioner.

The power conditioner 1012 transmits to a suppressed power amount measuring unit 1015 the amount of generation-suppressed power produced as a result of output control. The amounts of power measured by the suppressed power amount measuring unit 1015, the watt-hour meter 1016 of sold power amount and the watt-hour meter 1017 of purchased power amount are sent to a power amount data transmitting unit 1019, which in turn transmits the received amounts of power to a power data relay station 104. It is to be noted that the same description is true of customers 2 and 3.

At the power data relay station 104, a watt-hour meter measurement data receiving unit 1044 receives the above-mentioned amounts of power from the customers connected with the power system downstream of a pole-transformer 108. The amounts of power received from the respective customers by the watt-hour meter measurement data receiving unit 1044 are then stored in a database 1042 of watt-hour meter measurement data.

FIG. 3 is a table that lists the data stored in the database 1042 of watt-hour meter measurement data 104. The table cumulatively stores the customer IDs for distinguishing one customer from another, the amount of purchased power, the amount of sold power, and the amount of generation-suppressed power. This table in FIG. 3 exemplifies the monthly accumulated power amounts, with data measured in August and September of 2009 for five customers.

An watt-hour meter measurement data adjusting unit 1041 refers to the accumulated data in the database 1042 of watt-hour meter measurement data and calculates the amount of adjusted sold power in accordance with a preselected algorithm. A watt-hour meter measurement data transmitting unit 1043 transmits the amount of adjusted sold power to an aggregation server 1051 installed in a power data aggregation center 105 via the communication network 107. Later, on the basis of the power amounts aggregated by the aggregation server, electric power charges are calculated and debited for respective customers.

Figure 4:
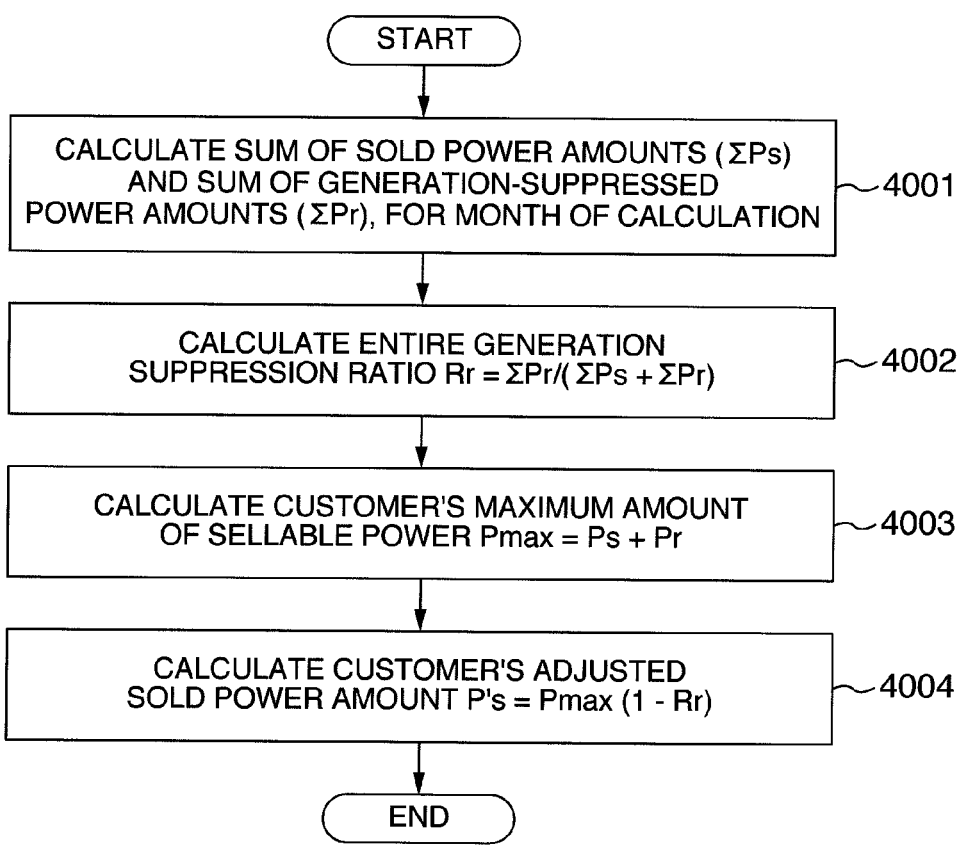
FIG. 4 is a flow chart illustrating a procedure of calculating the amount of adjusted sold power.

FIG. 4 is a flow chart illustrating a procedure of calculating the amount of adjusted sold power. First, the sum ΣPs of the amounts of power sold by all the customers for a specific month, and the sum ΣPr of the amounts of generation-suppressed power are calculated (Step 4001).

In the case shown in FIG. 4, the sum ΣPs08 of the amounts of power sold for August of 2009=900 kwh and the sum ΣPr08 of the amounts of generation-suppressed power for August of 2009=500 kwh; and the sum ΣPs09 of the amounts of power sold for September of 2009=550 kwh and the sum ΣPr09 of the amounts of generation-suppressed power for September of 2009=350 kwh.

Then, the suppression ratio for the entire power generation is calculated for the specific month of calculation (Step 4002).

The suppression ratio for the entire power generation can be calculated on the basis of the sums calculated in the Step 4001. To be concrete, the suppression ratio for the entire power generation is equal to the sum of the amounts of generation-suppressed power divided by (the sum of the amounts of sold power+the sum of the amounts of generation-suppressed power). It is the proportion of the generation-suppressed power relative to the superfluous power that could have been sold by all the customers administrated by the associated relay station.

In the case shown in FIG. 4, the suppression ratio for the entire power generation for August of 2009 is about 0.35 (500/1400) whereas the ratio for September of 2009 is about 0.39 (350/900).

Calculation is made of the maximum sellable power amount possible with respect to each customer for a specific month of calculation (Step 4003). The maximum sellable power amount possible is considered to be achieved when the generation-suppressed power can be sold. Therefore, it is the sum of the amount of sold power and the amount of the generation-suppressed power with respect to the specific individual customer.

Then, calculation is made of the amount of adjusted sold power for a month of calculation with respect to each customer (Step 4004). The amount of adjusted sold power is the amount of power that might have been sold when the customer suppressed the power generation in accordance with the suppression ratio for the entire power generation calculated in Step 4002. Therefore, the amount of adjusted sold power is equal to the maximum sellable power amount possible for each customer calculated in Step 4003 minus the power amount corresponding to the suppression ratio for the entire power generation.

The amounts of adjusted sold power calculated for respective customers in the case shown in FIG. 4, result in the values of adjusted sold power listed in the table in FIG. 3.

As described above, by adjusting the amounts of sold power and transmitting the adjusted sold power to the power data aggregation center, the ratio of the generation-suppressed power amount to the maximum sellable power amount possible can be made even among customers who are under the administration of a certain power data relay station.

In the embodiment described above, the amount of adjusted sold power is calculated in the power data relay station, but it may be calculated in the power data aggregation center. In the latter case, the amount of sold power and the amount of generation-suppressed power must be transmitted to the power data aggregation center.

Further, in the embodiment described above, the communication network 106 is separated from the communication network 107, but they may be integrated into a single network.

Also, in the embodiment described above, the power generation suppression ratios are calculated for the respective customers associated with one pole-transformer. However, this is not a restrictive requirement. For example, the power generation suppression ratios may be calculated for customers belonging to one transforming station. Or alternatively, like adjustment of sold power may be made for customers living within a certain geographical area, independent of power system.

Figure 5:
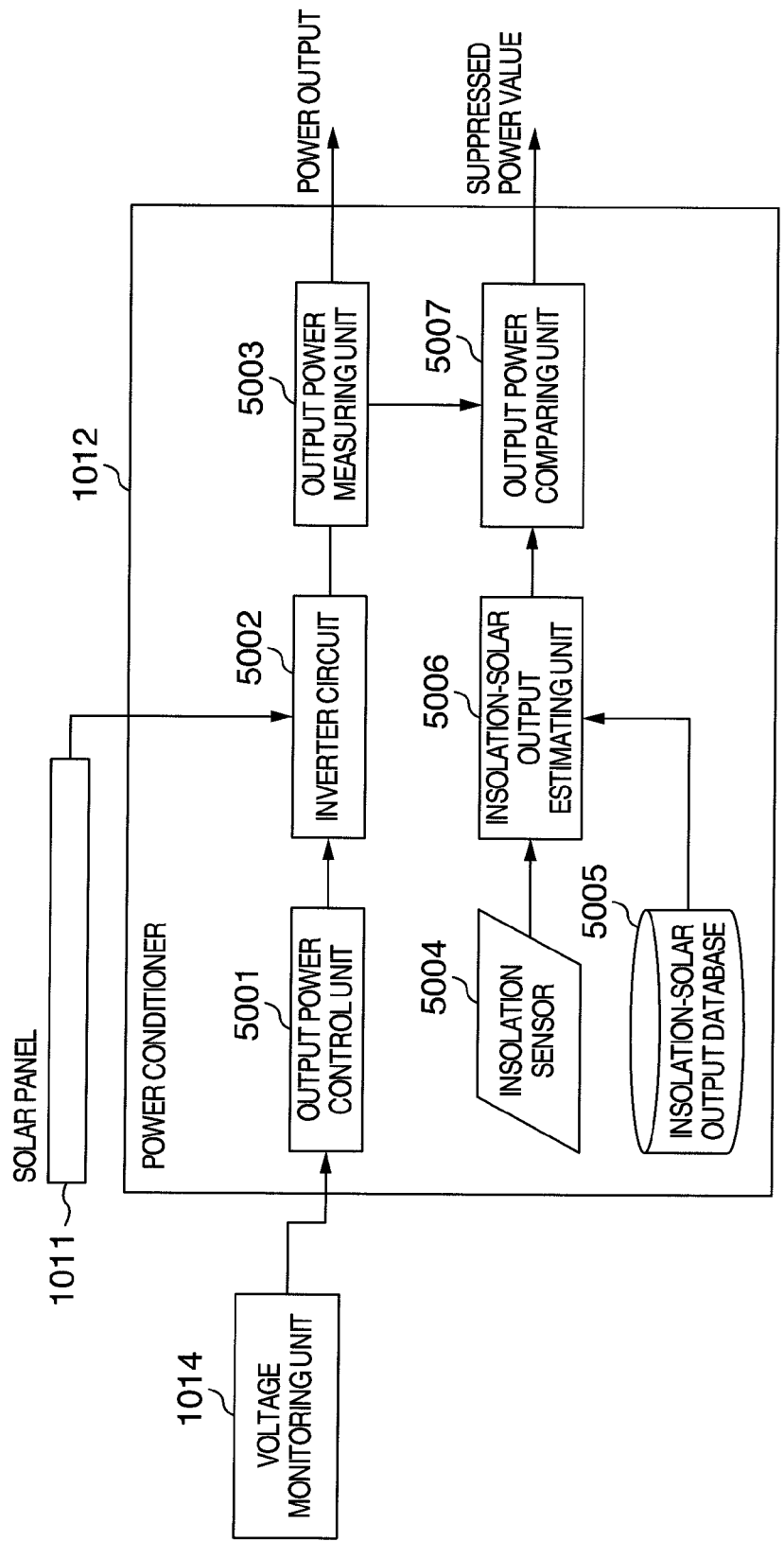
FIG. 5 shows in block diagram a configuration for calculating generation-suppressed power in the power conditioner.

FIG. 5 shows in block diagram a configuration for calculating generation-suppressed power in the power conditioner 1012. The power conditioner 1012 consists of an inverter circuit 5002 for converting DC power to AC power, an output power control unit 5001 for controlling the output of the inverter circuit 5002, an output power measuring unit 5003 for measuring the AC power outputted from the inverter circuit 5002, an insolation sensor 5004 for measuring the daily amount of insolation from the sun, an insolation-solar output database 5005 for recording the solar output relative to insolation, an insolation-solar output estimating unit 5006 for estimating the solar-generated power output expected from insolation, and an output power comparing unit 5007 for comparing the output measured by the output power measuring unit 5003 and the output estimated by the insolation-solar output estimating unit 5006 and outputting the difference between them.

When the voltage monitoring unit 1014 indicates that the voltage has risen to the level at which suppression is necessary, the output power control unit 5001 performs output suppression control over the inverter circuit 5002. The inverter circuit 5002 is usually operating so that its output voltage is maximum, i.e. under the maximum power follow-up control. However, it can output a suppressed voltage if its output voltage is changed by the output power control unit 5001.

Figures 6, 7:
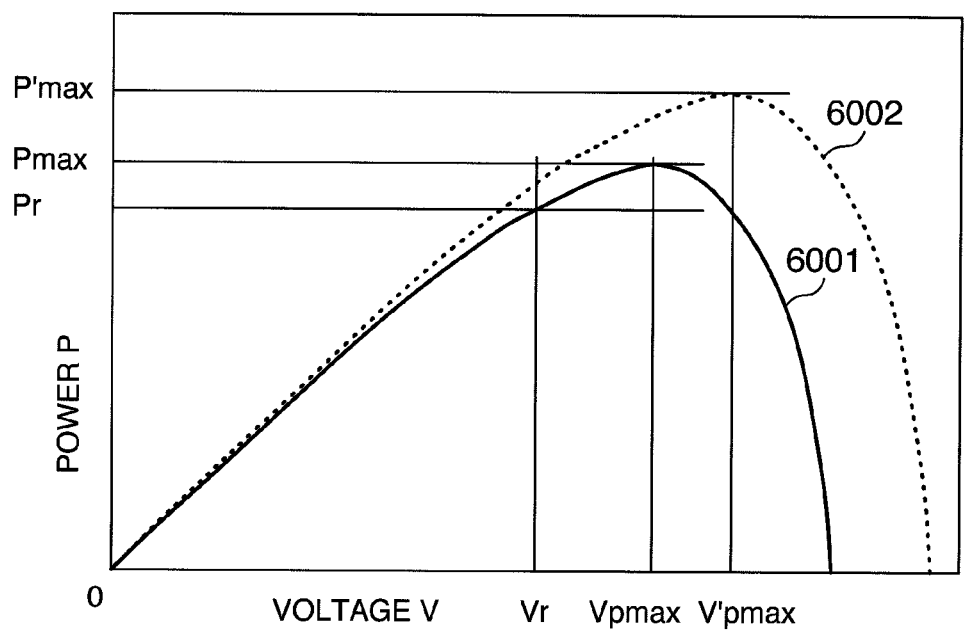
FIG. 6 graphically shows the power-voltage (P-V) characteristic of a solar battery.
FIG. 7 is a table illustrating the structure of the insolation-solar output database.

It is well-known that the solar battery has such a power-voltage (P-V) characteristic as shown in FIG. 6. Under the maximum power follow-up control, the operation is such that the operating voltage is so changed that the output power $P_{max}$ shown in FIG. 6 can be outputted. Accordingly, if the output power needs to be decreased to the level of $P_r$, the operating voltage must be decreased to the level of $V_r$. In other words, if the output power control unit 5001 performs control of decreasing voltage, the operating voltage tends to decrease. As a result, the power generated by the solar power generation system decreases and the voltage of the power system also decreases. When the voltage monitoring unit 1014 detects a voltage which indicates that the control of suppressing voltage rise is no more required, the voltage control unit 5001 stops the control of decreasing output. Consequently, the inverter circuit 5002 resumes the maximum power follow-up control to increase the operating voltage in general.

The insolation sensor 5004 is located near the solar panel 1011 so as to measure the insolation amount at the site of each customer.

It should be noted that the peak of the P-V characteristic curve shown in FIG. 6 changes depending on the intensity of insolation that the solar panel receives. Assumed that the curve 6001 is established for a certain insolation level, the dotted curve 6002 will be established for a more intense insolation level. That is, the attained characteristic is such that the maximum output $P'_{max}$ is outputted for the voltage $V'_{pmax}$.

The insolation-solar output database 5005 is the database that is made up of the maximum output of the solar power generation system relative to insolation amount. The insolation-solar output estimating unit 5006 estimates the maximum output power from the value measured by the insolation sensor 5004 in reference to the insolation-solar output database 5005.

The output power comparing unit 5007 estimates the output-suppressed power by subtracting the actual inverter output measured by the output power measuring unit 5003 from the maximum output voltage estimated by the insolation-solar output estimating unit 5006. The estimated result is outputted as the output-suppressed power value to the generation-suppressed power amount measuring unit 1015.

FIG. 7 is a table illustrating the structure of the insolation-solar output database. In FIG. 7 are listed the maximum generated power amounts versus their corresponding insolation amounts. In reference to this database, the maximum generated power at each point of insolation measurement can be estimated.

Figure 8:
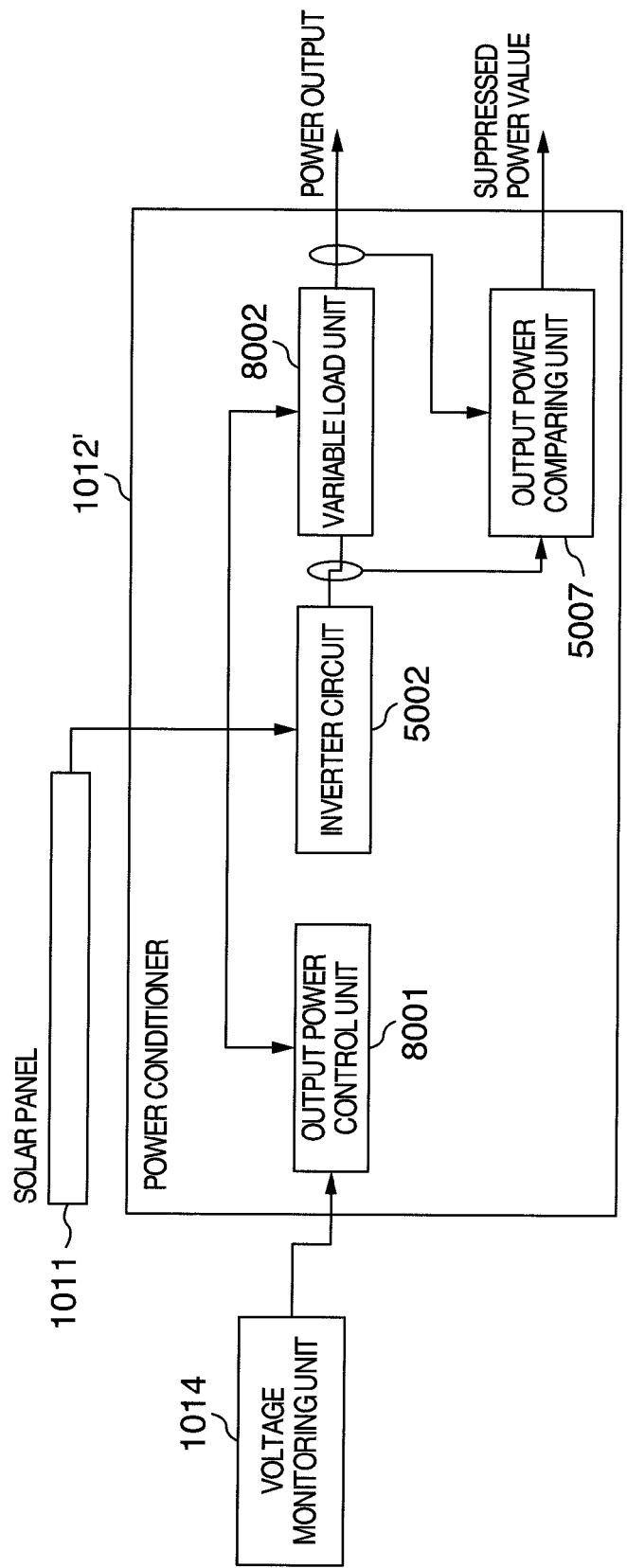
FIG. 8 shows in block diagram another example of a configuration for calculating generation-suppressed power.

FIG. 8 shows in block diagram another example of a configuration for calculating generation-suppressed power. A power conditioner 1012' consists of a variable load unit 8002 capable of changing the amount of load from zero to infinity, an output power control unit 8001 capable of controlling the amount of load in the variable load unit 8002, and an output power comparing unit 5007 for measuring the power values at the input and output of the variable load unit 8002 and calculating the difference between the power values.

When the voltage monitoring unit 1014 indicates that the voltage has risen to the level at which suppression is necessary, the output power control unit 8001 causes the variable load unit 8002 to increase its load.

The output power comparing unit 5007 can output a suppressed power value by comparing the input and the output of the variable load unit 8002. Since the power at the output is less than the power at the input by the amount equal to what was consumed by the load, the suppressed power can be regarded as the difference equal to the power at the input minus the power at the output.

According to this example, the inverter circuit has only to perform the maximum power follow-up control. Therefore, a conventional inverter circuit may be used so that the system configuration can be simplified. Further, the variable load unit 8002 may be replaced by a rechargeable battery charging unit capable of storing electric power.

Figure 9:
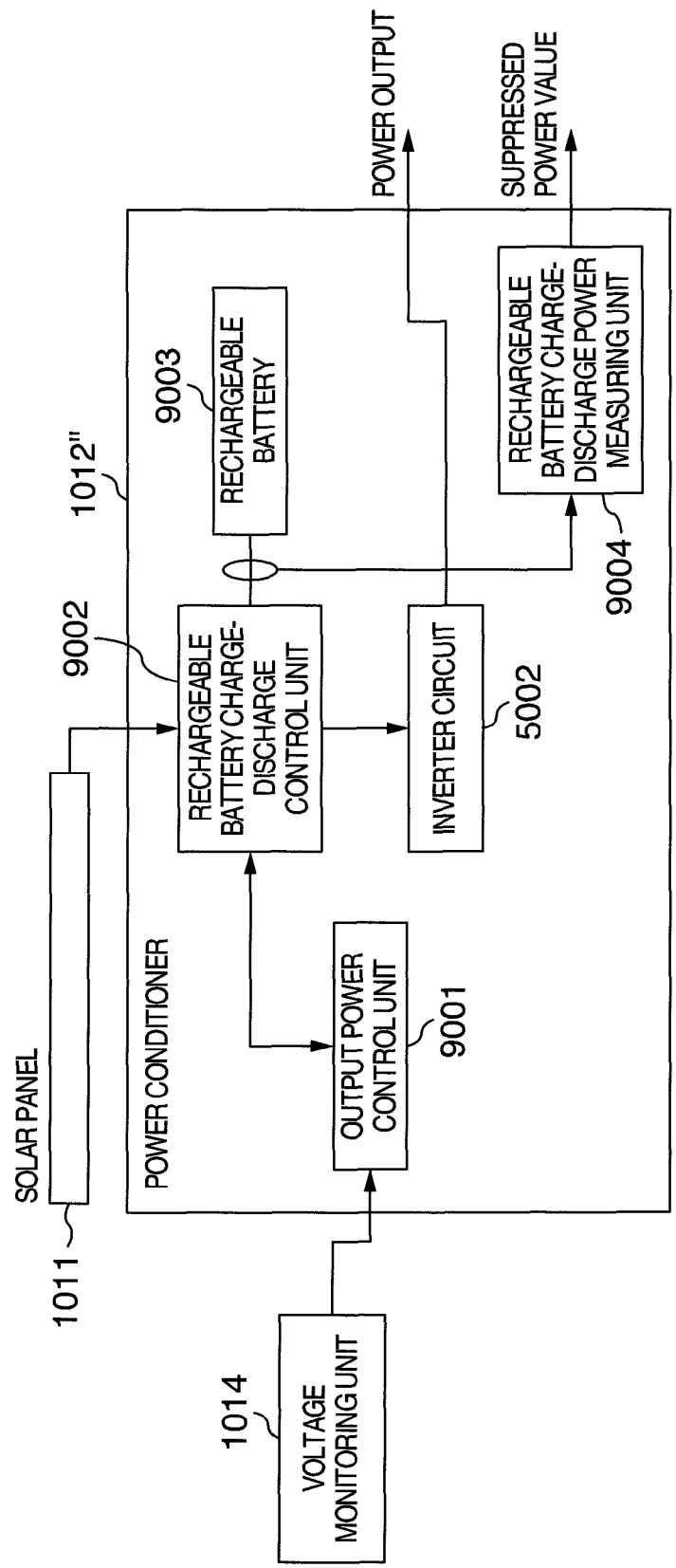
FIG. 9 shows in block diagram still another example of a configuration for calculating generation-suppressed power.

FIG. 9 shows in block diagram still another example of a configuration for calculating generation-suppressed power. A power conditioner 1012" consists of a rechargeable battery 9003, a rechargeable battery charge-discharge control unit 9002 for controlling the charge and discharge of the rechargeable battery 9003, an output power control unit 9001 for commanding the rechargeable battery charge-discharge control unit 9002 to control the charge and discharge of the rechargeable battery 9003, and a rechargeable battery charge-discharge power measuring unit 9004 for measuring the power charged into or discharged out of the rechargeable battery 9003.

When the voltage monitoring unit 1014 indicates that the voltage has risen to the level at which suppression is necessary, the output power control unit 9001 sends out a command for charging to the rechargeable battery charge-discharge control unit 9002. Further, when the voltage monitoring unit 1014 detects the voltage whose rise need not be suppressed, the output power control unit 9001 sends out a command for discharge to the rechargeable battery charge-discharge control unit 9002.

In response to the command for charging, the rechargeable battery charge-discharge control unit 9002 causes a part of the DC power generated by the solar panel 1011 to be used to charge the rechargeable battery 9003. In response to the command for discharge, on the other hand, the rechargeable battery charge-discharge control unit 9002 outputs the power discharged from the rechargeable battery 9003 to the inverter circuit in addition to the output of the solar panel 1011.

The rechargeable battery charge-discharge power measuring unit 9004 measures the power charged into or discharged from the rechargeable battery 9003 and outputs the measured quantity as the suppressed power value. The power discharged from the rechargeable battery is treated as the negative suppressed power. In this way, the power suppressed in the past is stored in the rechargeable battery and can be used through discharge whenever discharge is possible.

Moreover, the rechargeable battery charge-discharge control unit 9002 attempts to use a predetermined proportion of the power generated by the solar panel 1011 for charging the rechargeable battery. This operation will be described in reference to FIG. 10.

Figure 10:
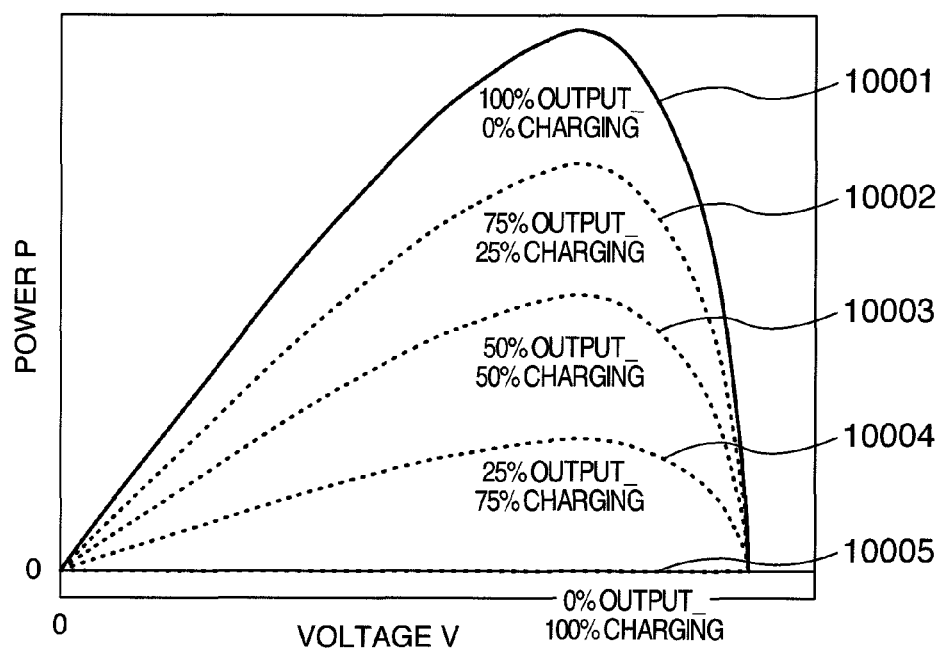
FIG. 10 graphically shows curves representing the outputs of the rechargeable battery charge-discharge control unit, supplied to the inverter circuit in the charge control of the rechargeable battery.

FIG. 10 graphically shows curves representing the outputs of the rechargeable battery charge-discharge control unit 9002, supplied to the inverter circuit 5002.

In FIG. 10, reference numeral 10001 indicates the curve representing the P-V characteristic, i.e. output power versus output voltage, for the solar panel 1011 for some insolation amount. As shown in FIG. 10, the rechargeable battery charge-discharge control unit 9002 has four levels of power charge. That is, in case of 0% power charge, the output power of the solar panel 1011 is directly outputted to the inverter circuit and therefore the direct output is indicated by the curve labeled 10001.

In case of 25% power charge, the output power is the 25% suppressed one indicated by the curve 10002. The difference between the outputs corresponding to the curves 10001 and 10002 is the amount of power charged into the rechargeable battery, namely the output-suppressed power.

In like manner, the outputs for 50%, 75% and 100% power charges are indicated by the characteristic curves 10003, 10004 and 10005, respectively.

Figure 11:
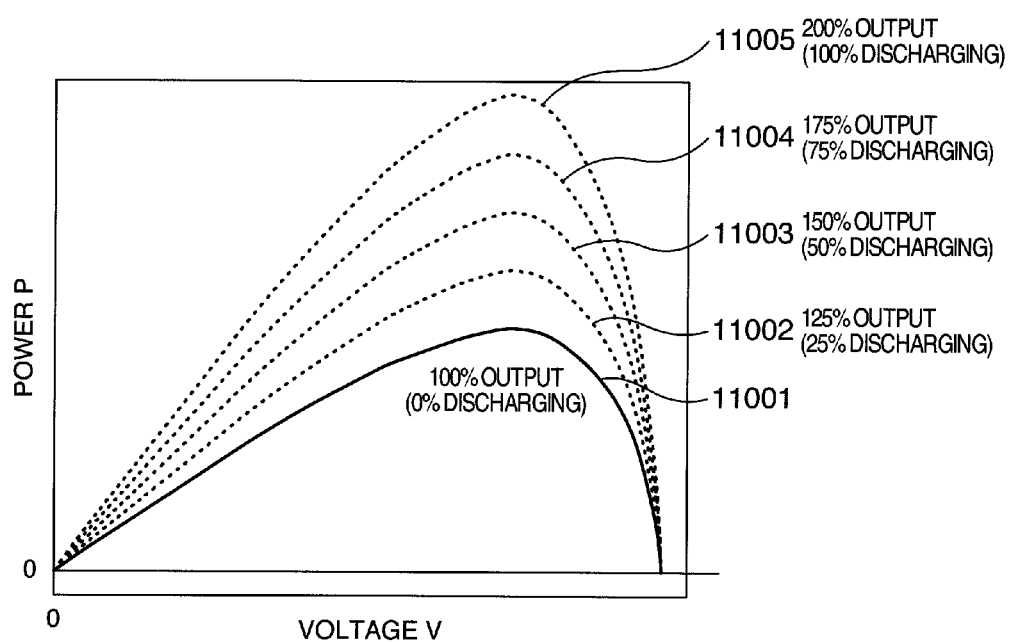
FIG. 11 graphically shows curves representing the outputs of the rechargeable battery charge-discharge control unit, supplied to the inverter circuit in the discharge control of the rechargeable battery.

In the process of discharge, for example, when a rechargeable battery which can deliver the same maximum output as the solar panel is incorporated, five discharge levels are set available as shown in FIG. 11. Curve 11001 corresponds to the characteristic of 0% discharge. Curve 11002 corresponds to the level for which 125% output is possible in case of no discharge from the rechargeable battery due to 25% discharge. In like manner, curves 11003, 11004 and 11005 correspond to the levels for which 150%, 175% and 200% outputs are possible due to 50%, 75% and 100% discharges, respectively.

Whenever receiving a charge command from the output power control unit 9001, the rechargeable battery charge-discharge control unit 9002 performs a process for increasing the level of charge so that more power can be charged into the rechargeable battery. On the other hand, whenever receiving a discharge command from the output power control unit 9001, the rechargeable battery charge-discharge control unit 9002 performs a process for increasing the level of discharge so that more power can be discharged from the rechargeable battery.

It is to be noted here that if the rechargeable battery is charged to its full capacity, no more charge is possible resulting in 0% charge, whereas if the battery is almost fully discharged, no more power can be discharged from the rechargeable battery, with the result of 0% discharge.

In this example, the levels of charge and discharge are separated from one another by 25% output, amounting to four levels of charge and discharge, respectively. However, the separation distance between levels may be smaller.

In this way, since the rechargeable battery charge-discharge control unit 9002 causes the rechargeable battery 9003 to charge or discharge that power equal to a predetermined proportion of the solar panel output, the voltage for which the maximum power can be obtained following the P-V characteristic remains invariable before and after the charge and discharge control so that no influence is imposed on the maximum power follow-up control for the inverter circuit.

Alternatively, the rechargeable battery used in this example may be replaced by a capacitor which is capable of rapid charge and discharge.

Further, the procedure, described in this example, for calculating the generation-suppressed power may be used in combination with the calculation procedure using the variable load unit described in reference to FIG. 8. In such a case, as output is delivered the sum of that suppressed power due to the charge and discharge of the rechargeable battery which is measured by the rechargeable battery charge-discharge power measuring unit 9004 and that suppressed power resulted from the variable load unit which is measured by the output power comparing unit 5005 as described with reference to FIG. 8.

Figure 12:
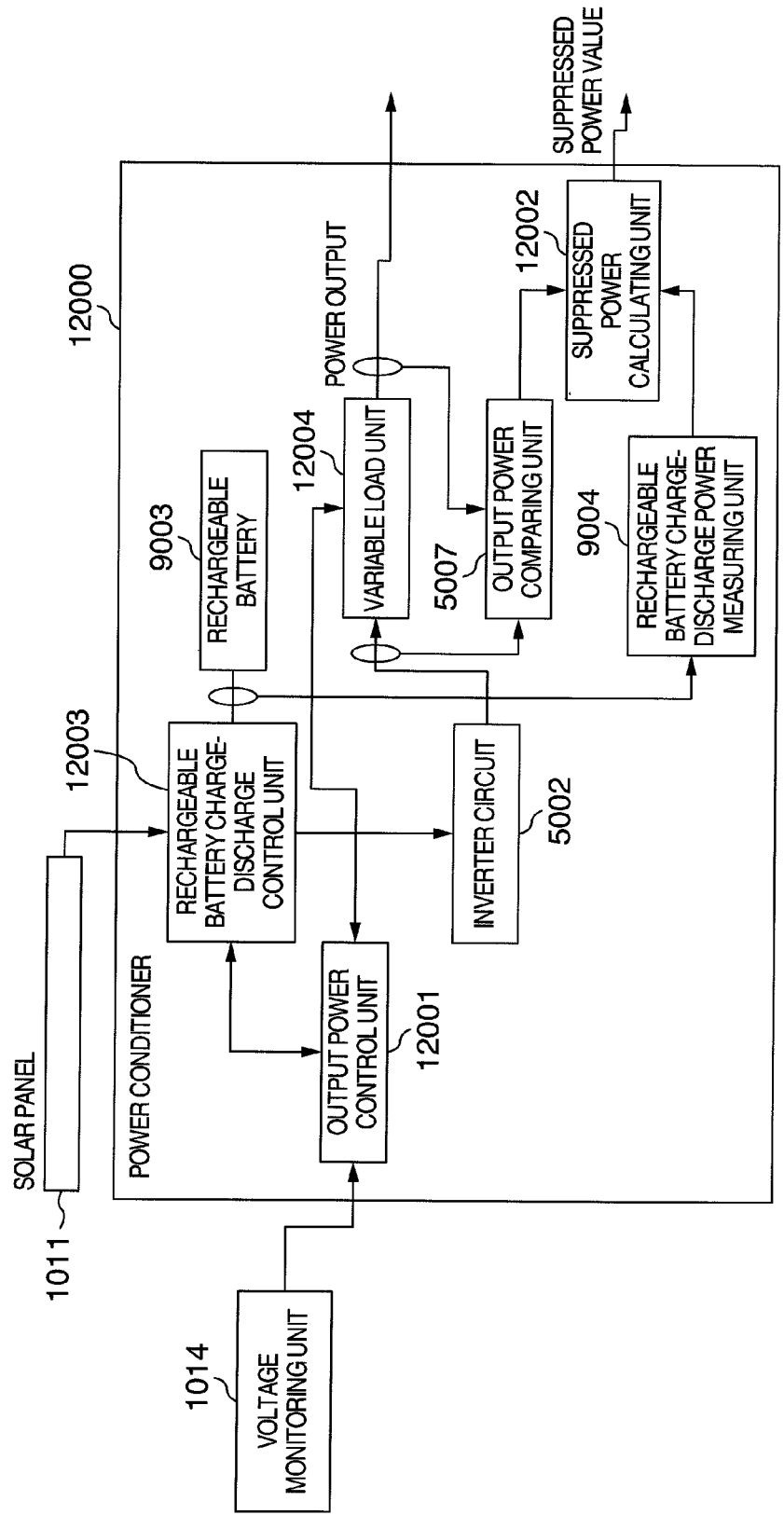
FIG. 12 shows in block diagram the structure of a power conditioner as an embodiment of this invention, which uses a rechargeable battery and a variable load unit that serve as a mechanism for absorbing generation-suppressed power.

FIG. 12 shows in block diagram the structure of a power conditioner 12000 as an embodiment of this invention, which uses a rechargeable battery and a variable load unit that serve as a mechanism for absorbing generation-suppressed power.

The power conditioner 12000 includes a rechargeable battery charge-discharge control unit 12003 having the function of notifying an output power control unit 12001 of the current extra power to be charged or discharged; a variable load unit 12004 having the function of notifying the output power control unit 12001 of the current state of load; the output power control unit 12001 for issuing the output control command to the rechargeable battery charge-discharge control unit 12003 and the variable load unit 12004; and a suppressed-power calculating unit 12002 for summing the suppressed power outputted from the output power comparing unit 5007 and the suppressed power outputted from the rechargeable battery charge-discharge power measuring unit 9004.

After the voltage has been measured by the voltage monitoring unit 1014, the output power control unit 12001 inquires the current extra power for charge or discharge from the rechargeable battery charge-discharge control unit 12003, and the current state of load from the variable load unit 12004.

It is to be noted here that the term "extra power for charge or discharge" can be interpreted as the information that the current level of charging or discharging power can be increased. For example, in FIG. 10 showing charge levels, there is no extra power to be charged for the case where operation is under way with 100% charge level or for the case where operation is under way with 0% charge level since the rechargeable battery is fully charged. On the other hand, in FIG. 11 showing discharge levels, there is no extra power to be discharged for the case where operation is under way with 100% discharge level or for the case where operation is under way with 0% discharge level since the rechargeable battery is fully discharged and therefore no more discharge is possible. It is also to be noted here that the state of load means the information on the amount of load developed by the variable load unit 12004.

When the measured voltage reaches the value at which output suppression is required, charging control takes place in such a manner that the rechargeable battery charge-discharge control unit 12003 tends to increase the charging level. At that time, if there is no extra power to be charged by the rechargeable battery charge-discharge control unit 12003, power charge control does not take place but the control of increasing load by the variable load unit 12004 takes place.

When the measured voltage does not reach the value at which output suppression is required, control takes place in such a manner that the variable load unit 12004 tends to decrease its load. If the load condition of the variable load unit 12004 is of no load, discharge control takes place in such a manner that the rechargeable battery charge-discharge control unit 12003 tends to increase the discharge level. It is a matter of course, however, that the current state is maintained if there is no extra power to be discharged at that time.

As described above, with the power conditioner 12000 of this embodiment of the invention, the effect of power suppression can be obtained by utilizing the charge and discharge of the rechargeable battery and the variable load.

Figure 13:
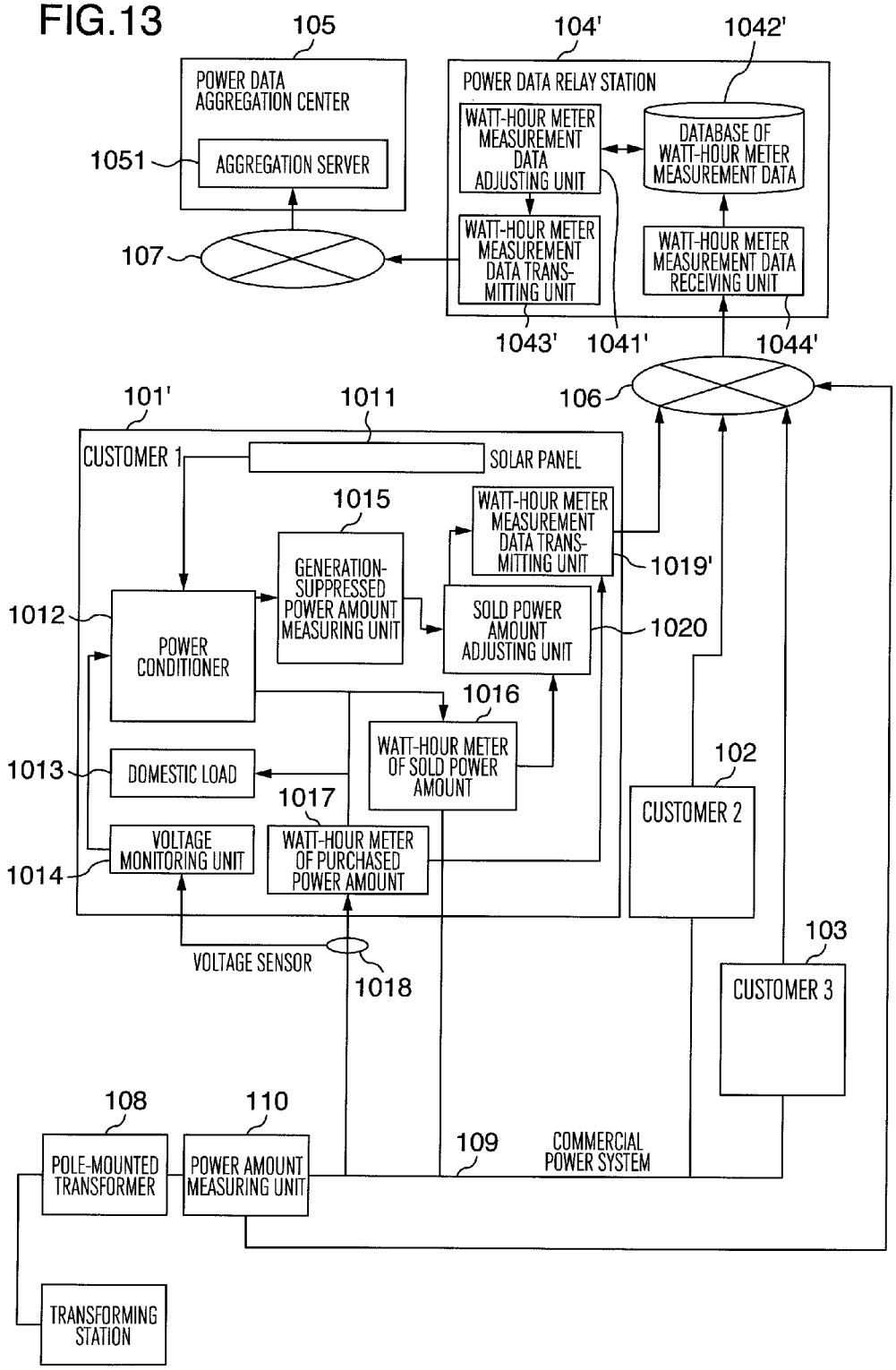
FIG. 13 shows in block diagram a solar power generation system as a second embodiment of this invention.

FIG. 13 shows in block diagram a solar power generation system as a second embodiment of this invention. This second embodiment differs from the first embodiment in that customer 1 (101') is provided with a sold power amount adjusting unit 1020 which receives the sold power amount from the watt-hour meter 1016 of sold power amount and the generation-suppressed power amount measured by the generation-suppressed power amount measuring unit 1015 and which adjust the amount of sold power; a power amount data transmitting unit 1019' which receives purchased power amount and the adjusted sold power amount and which transmits the received quantity to the power data relay station 104' via the communication network 106; and a power amount measuring unit 110 which measures the amount of power passing through the pole-transformer and transmits the measured power amount to the power data relay station 104 via the communication network 106.

The sold power amount adjusting unit 1020 of this embodiment transmits the primary adjusted sold power amount, which is obtained by summing the generation-suppressed power amount and the sold power amount, to the power data relay station 104'.

In the power data relay station 104', the watt-hour meter measurement data receiving unit 1044 receives the power amount data from the customer connected downstream of the pole-transformer with the power system and the amount of power passed through the pole-transformer, and the above mentioned power amount is stored in the database 1042' of watt-hour meter measurement data for each customer.

FIG. 14 is a table listing the content of the database 1042' of watt-hour meter measurement data, that is, data for respective customers. The database which is cumulatively stored, consists of customer IDs for discriminating among customers, the amounts of purchased power, the amounts of the primary adjusted sold power, and the times of measurement. The table in FIG. 14 shows an example in which power amounts are accumulated monthly. The accumulated data covers those measured in August and September of 2009, for five customers.

FIG. 15 is a table listing the amounts of power passed through the pole-transformer. This table includes the pole-transformer IDs for discriminating among respective pole-transformers, the times of measurement and the amounts of power. The accumulated power data covers those measured in August and September of 2009, for three pole-transformers.

An watt-hour meter measurement data adjusting unit 1041' calculates the finally adjusted sold power amount by using a predetermined algorithm in reference to the data accumulated in the database 1042' of watt-hour meter measurement data. The calculated finally adjusted power amount is transmitted to the aggregation server 1051 installed in the power data aggregation center 105 by means of a watt-hour meter measurement data transmitting unit 1043' via the communication network 107. The aggregation server later calculates power charge on the basis of the aggregated power amount so that each customer is debited for the charge.

Figure 16:
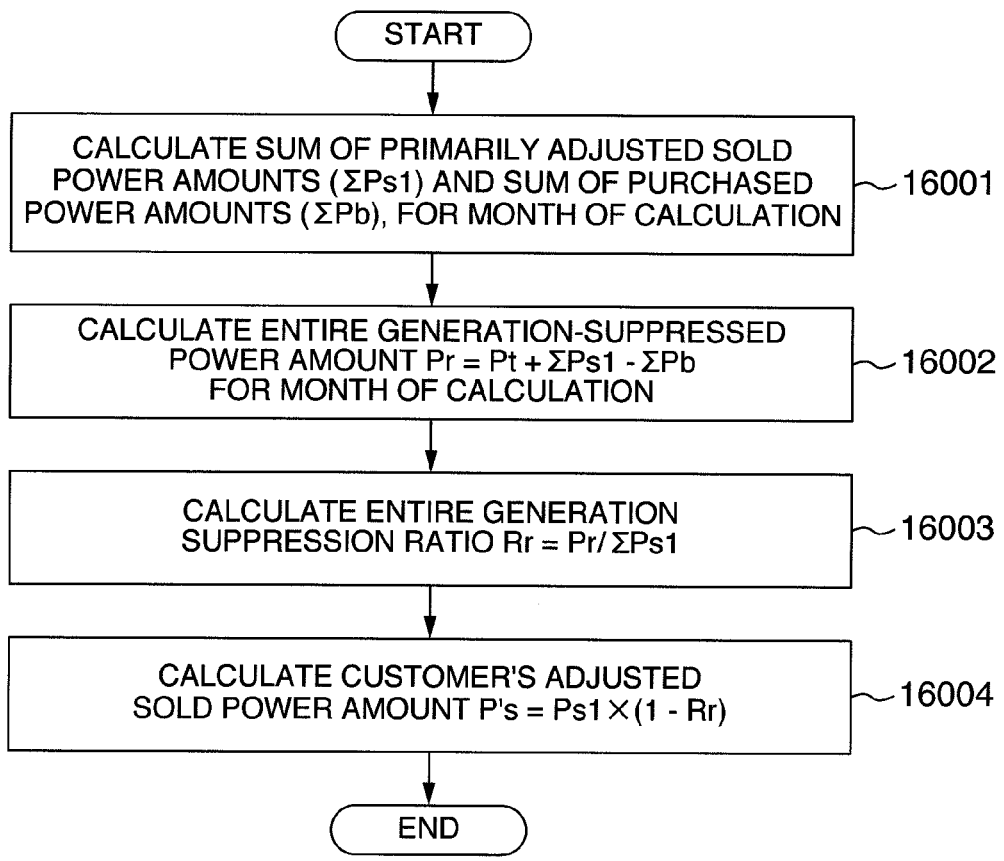
FIG. 16 is a flow chart illustrating an example of procedure for calculating the finally adjusted sold power amount.

FIG. 16 is a flow chart illustrating an example of procedure for calculating the finally adjusted sold power amount. First, the sum ΣPs1 of the primary adjusted sold power amounts and the sum ΣPb of the sold power amounts, of all the customers are calculated for the target month of calculation (Step 16001).

In the example shown in FIG. 16, the sum ΣPs108 of the primary adjusted sold power amounts and the sum ΣPb08 of the sold power amounts, in August of 2009 are equal to 1400 kwh and 1300 kwh, respectively, whereas the sum ΣPs109 of the primary adjusted sold power amounts and the sum ΣPb09 of the sold power amounts, in September of 2009 are equal to 900 kwh and 1200 kwh, respectively.

Secondly, the entire generation-suppressed power amount is calculated for the target month of calculation (Step 16002).

The entire generation-suppressed power amount Pr can be calculated by using the total amount of power passed through the pole-transformer and the total value calculated in the step 16001. In other words, it can be obtained by adding the value equal to the sum ΣPs1 of the primary adjusted sold power amounts minus the sum ΣPb of the sold power amounts, to the total amount Pt of power passed through the pole-transformer.

In the example shown in FIG. 14, the entire generation-suppressed power amounts Pr08 and Pr09 in August and September of 2009 are 500 kwh and 350 kwh, respectively.

Thirdly, the entire generation suppression ratio is calculated for the target month of calculation (Step 16003). The entire generation suppression ratio is the ratio of the entire generation-suppressed power amount Pr calculated in the step 16002 to the sum ΣPs1 of the primary adjusted sold power amounts. In the example shown in FIG. 14, the entire generation suppression ratios in August and September of 2009 are about 0.35 (500/1400) and about 0.39 (350/900), respectively.

Finally, the adjusted sold power amount for each customer is calculated for the target month of calculation (Step 16004). The adjusted sold power amount for each customer is the power amount equal to (1−the entire generation suppression ratio calculated in the step 16003)×(the primary adjusted sold power amount for each customer).

Accordingly, in the example shown in FIG. 14, the adjusted sold power amounts calculated for respective customers are those values given in the column "adjusted sold power amount" in FIG. 14.

As described above, according to this embodiment of the invention, since each customer can calculate the adjusted sold power amount on the basis of the sold power amount, the sold power amount with the suppressed power amount added thereto (primary adjusted sold power amount) and the amount of power passed through the pole-transformer, then this embodiment has the advantage that the amount of data transmitted from each customer to the power relay station can be reduced.

As described heretofore, according to the embodiments of this invention, the suppressed power amount as well as the reverse flow power from each solar power generation apparatus can be figured out. Therefore, the power amount that could have been generated but was suppressed for the stabilization of power system, i.e. power loss due to the loss of chance for selling power, can be figured out and this loss of chance for selling power can be regarded as contribution to the stabilization of power system.

Further, since suppressed power amount is controlled and corrected so that the differences between the loss of chance for selling power with respect to all the solar power generation apparatuses and the losses of chance for selling power with respect to the individual solar power generation apparatuses, can be balanced, then the losses of chance for selling power with respect to the individual solar power generation apparatuses can be evenly adjusted.

Moreover, the data communication unit is provided with a unit for summing reverse flow power amount and the amount obtained by multiplying suppressed power amount by a preselected factor, and transmits only the value of the sum to the system administration apparatus. The system administration apparatus processes the value of the sum as reverse flow power. Therefore, since the amount of generation-suppressed power suppressed to contribute to the stabilization of power system can be added as sold power amount, the generation-suppressed power can be evaluated as the power that contributes appreciably to the stabilization of power system.

In the foregoing description, this invention is exemplified as a case where solar power generation apparatuses are connected as multiple power sources with a commercial power system. However, it will be easily understood that this invention can be likewise applied to a case where such other power generation systems utilizing natural energies as wind power generation systems or tidal power generation systems are used as distributed power sources.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A solar power generation system comprising:
    plural electricity generation devices each having a solar panel and incorporating a power conversion apparatus for converting DC output from the solar panel into AC output which is supplied to a commercial power system;
    a control unit for monitoring the output voltage of the power conversion apparatus, normally performing maximum power follow-up control so that the power conversion apparatus can generate its maximum power, and performing output-suppression control that suppresses the output of the power conversion apparatus when the output voltage becomes higher than a predetermined value; and a measuring unit for measuring the amount of power to be sold from the power conversion apparatus, the amount of power to be bought from the commercial power system, and the amount of generation-suppressed power generated when the output is suppressed; and
    an watt-hour meter measurement data adjusting unit linked with the plural electricity generation devices via a communication lines;
    wherein the watt-hour meter measurement data adjusting unit calculates virtual generation-suppressed power amounts that make the burdens of the electricity generation devices even, independent of the actual generation-suppressed power amounts, and calculates the amounts of power to be sold by the electricity generation devices on the basis of the virtual generation-suppressed power amounts.

2. A solar power generation system as claimed in claim 1, wherein the generation-suppressed power amount is calculated as the difference between the maximum amount of generated power and the actual value of output power.

3. A solar power generation system as claimed in claim 2, wherein the maximum amount of generated power and the actual value of output power are calculated as a result of integrations over a predetermined interval.

4. A solar power generation system as claimed in claim 1, further comprising a transmitting unit for transmitting the data as the generation-suppressed power amount to the watt-hour meter measurement data adjusting unit.

5. A solar power generation system as claimed in claim 1, further comprising an insolation sensor and a memory for storing the amount of power generated when the output of the solar panel is not suppressed relative to insolation, wherein the power that can be generated without the power suppression is estimated from the measurement value of the insolation sensor.

6. A solar power generation system as claimed in claim 1, wherein a controllable variable load is provided as a unit for suppressing generated power output; generated power is consumed by the variable load; and generation-suppressed power is outputted.

7. A solar power generation system as claimed in claim 1, wherein a rechargeable battery is provided as a unit for suppressing generated power output;
    generated power is consumed through electric charge into the rechargeable battery;
    and generation-suppressed power is outputted.

8. A solar power generation system as claimed in claim 7, wherein generated power is booted up by discharging the rechargeable battery when there is no need for suppressing generated power.

9. A solar power generation system as claimed in claim 7, wherein the rechargeable battery is charged with the DC power outputted from the solar panel.

10. A solar power generation system as claimed in claim 7, wherein power discharged from the rechargeable battery is added to the DC power output from the solar panel.

11. A power generation system utilizing natural energy, comprising:
    plural electricity generation devices each having a solar panel and incorporating a power conversion apparatus for converting DC output from the solar panel into AC output which is supplied to a commercial power system; a control unit for monitoring the output voltage of the power conversion apparatus, normally performing maximum power follow-up control so that the power conversion apparatus can generate its maximum power, and performing output-suppression control that suppresses the output of the power conversion apparatus when the output voltage becomes higher than a predetermined value; and a measuring unit for measuring the amount of power to be sold from the power conversion apparatus, the amount of power to be bought from the commercial power system, and the amount of generation-suppressed power generated when the output is suppressed; and an watt-hour meter measurement data adjusting unit linked with the plural electricity generation devices via a communication lines;

wherein the watt-hour meter measurement data adjusting unit calculates virtual generation-suppressed power amounts that make the burdens of the electricity generation devices even, independent of the actual generation-suppressed power amounts, and calculates the amounts of power to be sold by the electricity generation devices on the basis of the virtual generation-suppressed power amounts.

* * * * *